United States Patent
Newkirk et al.

(12) 
(10) Patent No.: US 6,308,645 B1
(45) Date of Patent: Oct. 30, 2001

(54) SEEDING MACHINE WITH BULK SEED SUPPLY CONTAINER AND INDEPENDENT, OPENER-MOUNTED METERING DEVICES

(75) Inventors: Kevin J. Newkirk, Salina; Gregory W. Arnett, Solomon; J. Michael McClure, Lindsborg, all of KS (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 0 days.

(21) Appl. No.: 09/475,866

(22) Filed: Dec. 30, 1999

(51) Int. Cl.⁷ .................................................. A01C 5/06
(52) U.S. Cl. ............................ 111/63; 111/184; 221/185; 221/277
(58) Field of Search .................................. 111/60, 62, 63, 111/52, 54, 59, 170, 174, 177, 183, 184, 185, 178, 179, 182; 221/211, 222, 277, 278, 185

(56) References Cited

U.S. PATENT DOCUMENTS

| | | |
|---|---|---|
| 2,605,023 | 7/1952 | Ward ..................................... 222/177 |
| 3,156,201 | 11/1964 | Tweedale ............................... 111/77 |
| 3,387,746 | 6/1968 | Whipple ................................. 221/211 |
| 3,598,069 * | 8/1971 | Hatcher et al. ..................... 111/62 X |
| 3,715,057 | 2/1973 | Becker ................................... 221/211 |
| 3,954,204 | 5/1976 | Becker ................................... 221/211 |
| 4,023,509 | 5/1977 | Hanson ............................. 221/211 X |
| 4,026,437 | 5/1977 | Biddle .................................... 221/211 |
| 4,037,755 | 7/1977 | Reuter .................................... 221/211 |
| 4,094,444 | 6/1978 | Willis ..................................... 221/266 |
| 4,239,126 | 12/1980 | Dobson et al. ....................... 221/211 |
| 4,282,985 | 8/1981 | Yamamoto ............................. 221/254 |
| 4,306,509 | 12/1981 | Hassan et al. .................... 221/211 X |
| 4,324,347 | 4/1982 | Thomas ................................. 221/237 |
| 4,478,159 * | 10/1984 | Melgoza ............................. 111/60 X |
| 4,516,690 | 5/1985 | Andersson ............................ 221/233 |
| 4,519,525 | 5/1985 | Wunschl et al. ...................... 221/211 |
| 4,703,868 | 11/1987 | Shaw ..................................... 221/211 |
| 4,741,428 | 5/1988 | Taniguchi et al. .................... 198/397 |
| 5,709,271 * | 1/1998 | Bassett ............................... 111/63 X |

OTHER PUBLICATIONS

Krause Corporation brochure entitled "Pro–Air No–Till Drill 10, 13, 15 and 20 ft.", Form No. 10M (4/99).
Krause Corporation brochure entitled "Folding Grain Drills 3–Section, 25, 30 & 36 ft.", Form No. KR8983.5M.
Agco Corporation brochure entitled "White Planters" NI99021 (02).
Speed King Inc. brochure entitled "CrustBuster".
Kinze Manufacturing, Inc. brochure entitled "Kinze 3000 Series Planters" PL 7–99.

* cited by examiner

*Primary Examiner*—Christopher J. Novosad
(74) *Attorney, Agent, or Firm*—Hovey, Williams, Timmons & Collins

(57) ABSTRACT

A seeding machine has a common, bulk seed container that supplies a number of independent openers, each of which is provided with its own separate metering device. Each metering device is gravity-fed through a telescoping supply tube connected between the top of the metering device and the bottom of the seed container. Each metering device has a relative narrow metering wheel rotatable about a transverse horizontal axis that is provided with one or more rows of seed pockets on its outermost peripheral edge. As the wheel rotates upwardly through a pool of incoming seeds that have collected generally above the wheel in a seed chamber inside the metering device, the pockets become filled by gravity with seeds and then successively discharged at the bottom of the downsweep side of the wheel. Spring-loaded retaining structure along the downsweep side of the wheel keeps the seeds within their respective pockets until the pockets reach the discharge outlet at the bottom of the meter, whereupon the seeds gravitate freely from the wheel in succession and are directed to the ground.

58 Claims, 9 Drawing Sheets

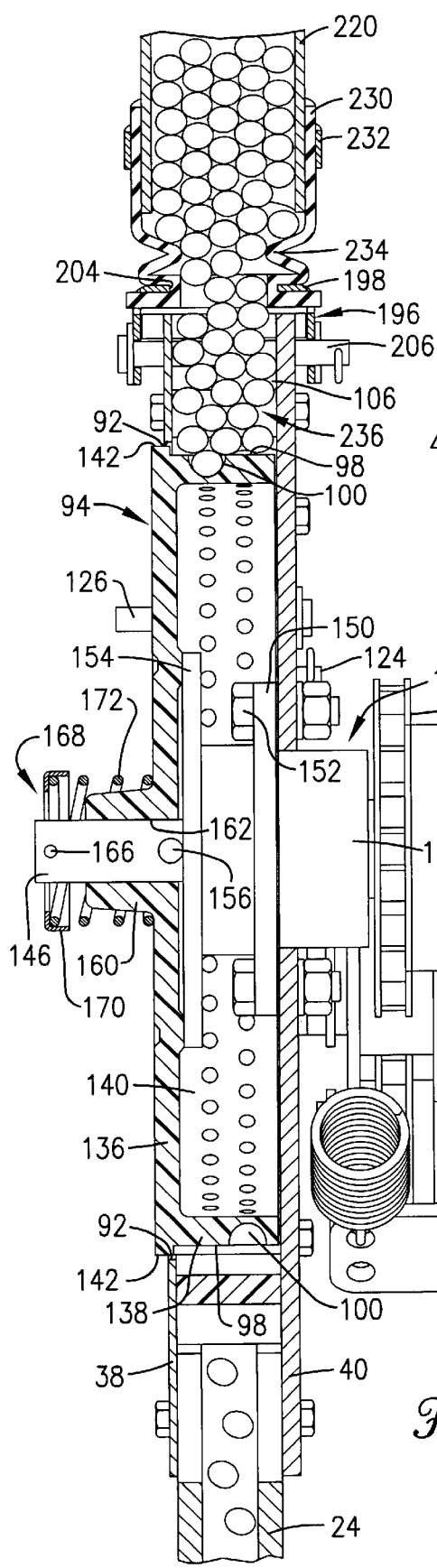
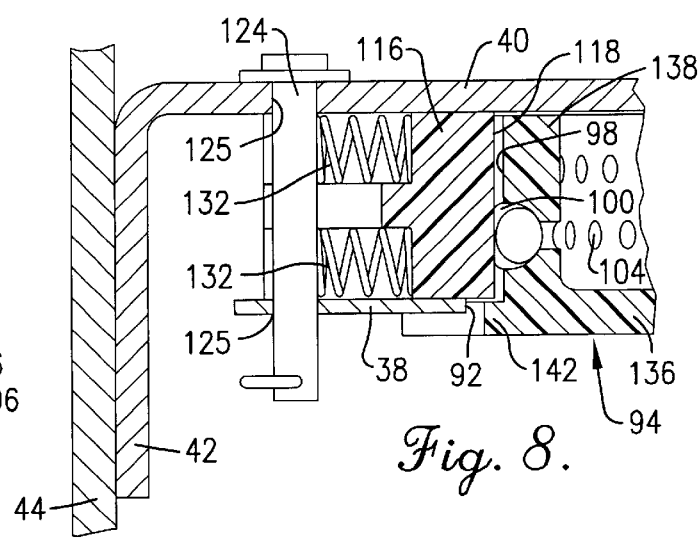
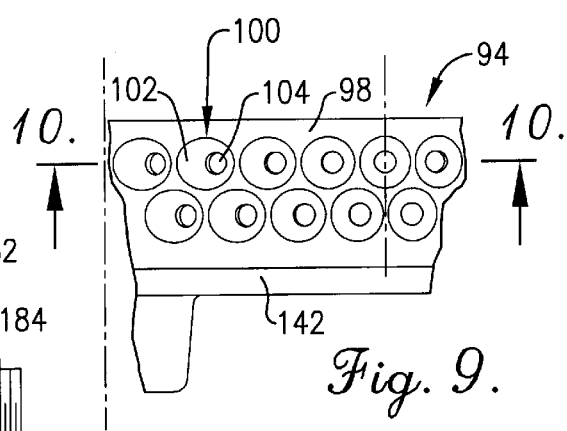
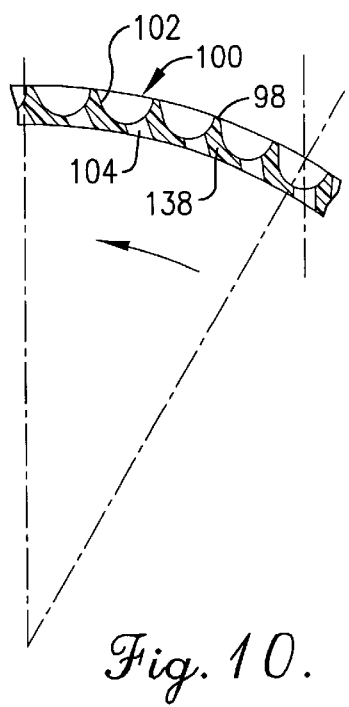
Fig. 7.
Fig. 8.
Fig. 9.
Fig. 10.

SEEDING MACHINE WITH BULK SEED SUPPLY CONTAINER AND INDEPENDENT, OPENER-MOUNTED METERING DEVICES

TECHNICAL FIELD

This invention relates to the field of agricultural machinery and, more particularly, to an improved seed planting machine.

BACKGROUND

Seed planting machines have typically been equipped with one of two different systems for containing the supply of seeds on the machine and metering them to openers that place the seeds below the surface of the ground. In one system a large bulk container for the seed supply has a number of meters attached directly to the bottom of the container, as is typically found on grain drills. Seeds discharging from the meters pass through flexible hoses which are essentially empty except for the slow trickle of seeds coming out of the meters. The principal advantage of the bulk supply system is ease of filling and a large capacity so as to reduce the number of times the operator must stop to refill the seed container.

This system sometimes suffers from irregular seed spacing as the seeds are disturbed from their intended metered spacing by impinging against corrugations or bellows in the hoses that are there to permit the hoses to expand and retract to accommodate changes in the distance between the container and the opener as the opener moves over uneven terrain relative to the container. During such up and down movement of the opener, the hoses can also develop bends or slight curves, which position the internal hose surfaces at locations causing them to be impinged by the metered seeds, thus preventing their straight, unhindered drop to the openers.

Some machines have replaced the flexible hoses with telescoping, straight tubes between meters on the underside of the seed container and the openers. However, such arrangements do not address the problems of poor metering and irregular seed spacing caused by constant changes in the opener as it moves up and down relative to the container, such motion having the effect of constantly changing the distance a particular seed must travel from the meter to the soil.

A second type of system is one in which a small individual container of seeds is attached to each individual opener. In this system the seed metering device is attached to or built directly into the opener itself. This type of system is typically found on machines generically called "planters" in the industry.

In this type of machine the seeds travel from each individual container into a pool of seeds at the meter and then drop through the opener into the soil. This system tends to have improved seed spacing as the distance the seed must travel after leaving the metering device is constant relative to the soil. The distance the seed must travel is also usually much smaller than on a typical grain drill, leaving less opportunity for the seed drop to be disrupted as the machine moves across the field.

However, the multiple small containers typically have a much reduced overall volume than a bulk seed container as found on a grain drill, necessitating much more frequent stops while seeding to replenish the seed supplies in the individual containers. The many small containers spread across the width of the entire machine each come with their own lids which must be removed and replaced, making filling less convenient than with a central bulk container having only a single lid. Moreover, the individual small containers must typically be removed and inverted to empty excess seeds from them when changing from one crop to another, and when removing metering disks associated with the meters during service or for other purposes.

Furthermore these container/meter/opener units are typically much wider than the openers on grain drills, which prevents planters from achieving row spacing as narrow as that possible with drills.

SUMMARY OF THE INVENTION

Accordingly, one important object of the present invention is to provide a seeding machine that achieves the benefits of the foregoing two different types of seeding systems without their attendant disadvantages. More particularly, an object of the present invention is to provide in a seeding machine the filling convenience and reduction in refill stops associated with a large central bulk seed container and the more precise seed spacing that results from having individual metering devices independently attached to each opener of the machine, rather than to the bottom of the seed container.

Another important object of the invention is to provide a highly versatile seed planting machine that is suitable for planting a variety of different crops.

In addition, an important object of the invention is to provide a relatively narrow profile design for an opener-mounted seed meter such that adjacent openers can be more closely spaced apart than would otherwise be the case, permitting the farmer to achieve narrower row spacing without sacrificing precision in the spacing of the individual seeds within each row.

A further important object is to provide for accurate and precise seed metering, including the singulating of seeds, by a metering device that does not require the use of positive pressure air or vacuum to carry out its metering function.

A further important object of the present invention is to provide away of insuring continuous flow of seeds from the bulk container to the individual metering devices as the openers move up and down over uneven or hilly terrain, to the end that seeds are always available to the individual metering devices.

In carrying out the foregoing and other important objects, the present invention contemplates a seeding machine in which one or more large bulk containers supply seeds to the individual openers of the machine through an independent metering device carried on each of the openers and movable therewith during up and down travel over uneven terrain relative to the seed container. Each metering device is gravity-fed and is strictly mechanical, requiring no positive pressure air or vacuum to assist in carrying out the metering function. In one preferred form of the invention, each meter is adapted for singulation of the seeds, while in another preferred form the meters can function to dispense seeds on more of a volume basis, but still with greater accuracy and precision than a conventional fluted metering wheel.

The heart of each meter is a metering wheel having a plurality of seed-receiving pockets about its outermost peripheral edge. Such edge may be provided with only a single row of pockets, or with multiple rows of pockets as may be necessary or desired, the width of the edge and thus the overall width of the meter itself being dependent upon the number of rows of pockets chosen to be included on the wheel. Stated otherwise, the fewer the number of rows of pockets, the thinner the edge of the wheel can be, resulting in a thinner overall metering device.

Seeds gravitating from the overhead container collect in a pool in the upper portion of the metering device. Preferably, this pool of collected seeds is no wider than the wheel itself so that the slim profile of the meter can be maintained. The chamber in which the pool collects is configured in such a way that there is an overhead portion directly above top center of the wheel, as well as a pair of side portions disposed along opposite upsweep and downsweep sides of the wheel, respectively. Best results have been obtained by having the upsweep portion of the chamber extend down to a point below a point of vertical tangency on the wheel, preferably almost to bottom center. On the other hand, the downsweep portion of the chamber desirably extends to a point slightly above a point of vertical tangency on the downsweep side of the wheel. This gives seeds in the pool more than 215° of the wheel surface to find a pocket to be received in before access to the wheel is cut off. The pockets pass beneath a retaining structure on the downsweep side of the wheel that keeps the seeds in the pockets until they reach the discharge outlet at the bottom of the metering device. Preferably, the retaining structure on the downsweep side of the wheel comprises a spring-loaded member biased toward the wheel and provided with an arcuate face complemental to the edge of the wheel. Furthermore, in its preferred form, the pockets on the wheel are slightly shallower than the maximum transverse dimension of the seeds intended to be metered such that a seed actually projects slightly out of its pocket and beyond the peripheral edge into contact with the retaining structure during movement along the downsweep portion of the wheel's path of travel.

The metering wheel is quickly and easily removed from the housing of the meter. Thus, the wheel can be readily replaced with a different wheel having differently shaped seed pockets for handling different seeds if desired.

The inlet at the top of the meter housing can be closed by a convenient gate, if desired. This permits selected ones of the meters to be temporarily disabled so as to change the row spacing on the seeds being planted. The gate may also be closed when the metering wheel needs to be removed for any reason, thus avoiding the loss of large quantities of seed when a wheel is removed from the housing for replacement or repair. Instead of a flexible, corrugated hose between the seed container and each underlying meter, an extendable and retractable, stiff-walled tube is utilized. In the preferred form of the invention, the two sections of the tube are mutually telescopic, with the upper larger diameter section secured to the bottom of the container and the lower smaller diameter section secured to the metering device and slidably received within the upper section. The supply tube is continually fully filled with seed such that the meter is always presented with a full supply seed while operating in the field. When a particular opener rises relative to the container, the lower tube section telescopes up further into the upper section, returning the excess seed which will not fit into the shortened overall distance between the container and the raised opener back up into the container. When the opener falls relative to the container, the lower section is pulled downwardly partially out of the upper section so as to effectively extend the length of the tube. Seed will continue to flow into the extended volume from the container by gravity, thus keeping it full. Because the tube does not bend, kink or sag, but instead maintains its straight-line configuration and remains full of seeds at all times, regardless of the position of the opener, a full supply of seeds is always available to the metering device.

BRIEF DESCRIPTION OF THE DRAWINGS

FIG. 7 is an enlarged, fragmentary cross-sectional view through the metering device of FIG. 5 taken substantially along line 7—7 of FIG. 5;

FIG. 8 is an enlarged fragmentary cross-sectional view through the metering device of FIG. 5 and taken substantially along line 8—8 of FIG. 5;

FIG. 9 is an enlarged, fragmentary plan view of the edge of the metering wheel of a metering device illustrating details of construction of the pockets formed in the edge of the wheel;

FIG. 10 is a transverse cross-sectional view through the metering wheel taken substantially along line 10—10 of FIG. 9 to illustrate the manner in which the pockets are inclined forwardly with respect to the intended direction of travel of the wheel;

DETAILED DESCRIPTION

Figure 1:
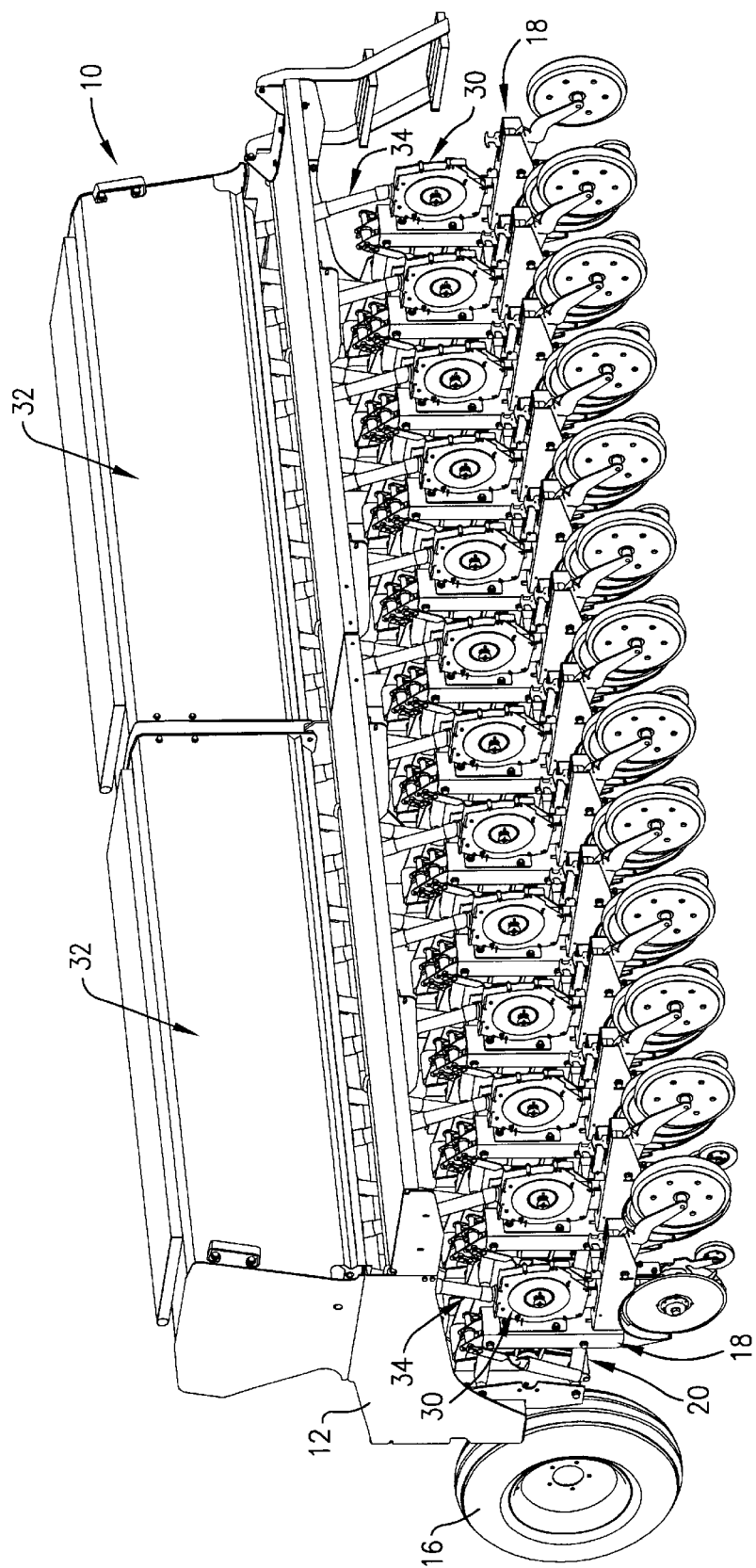
FIG. 1 is a left, rear isometric view of a seeding machine constructed in accordance with the principles of the present invention.
Figure 2:
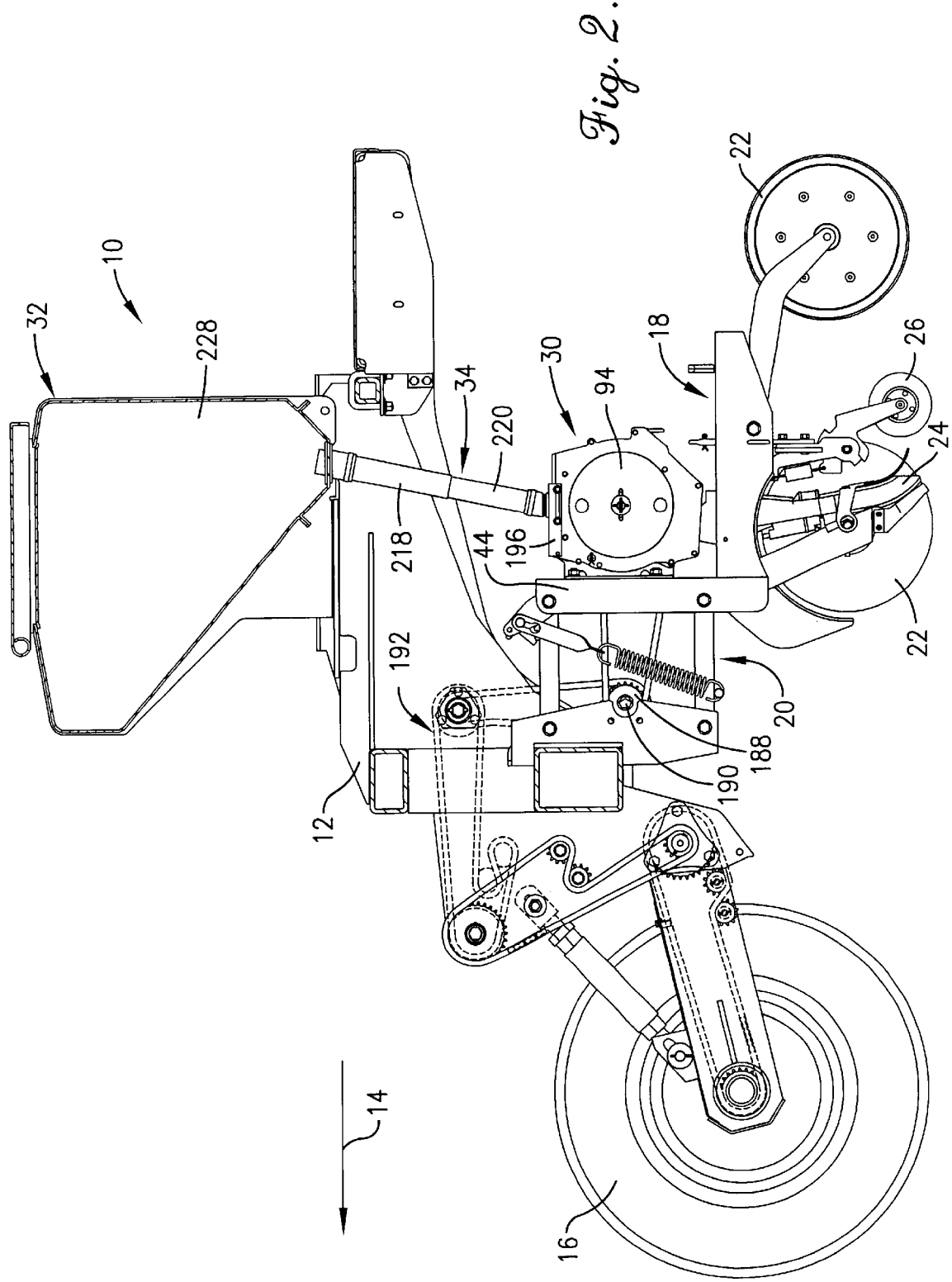
FIG. 2 is a vertical cross-sectional view through the machine of FIG. 1 taken inboard of the left gauge wheel of the machine and illustrating only one of the openers and its associated metering device and seed tube to facilitate a clear understanding.
Figure 3:
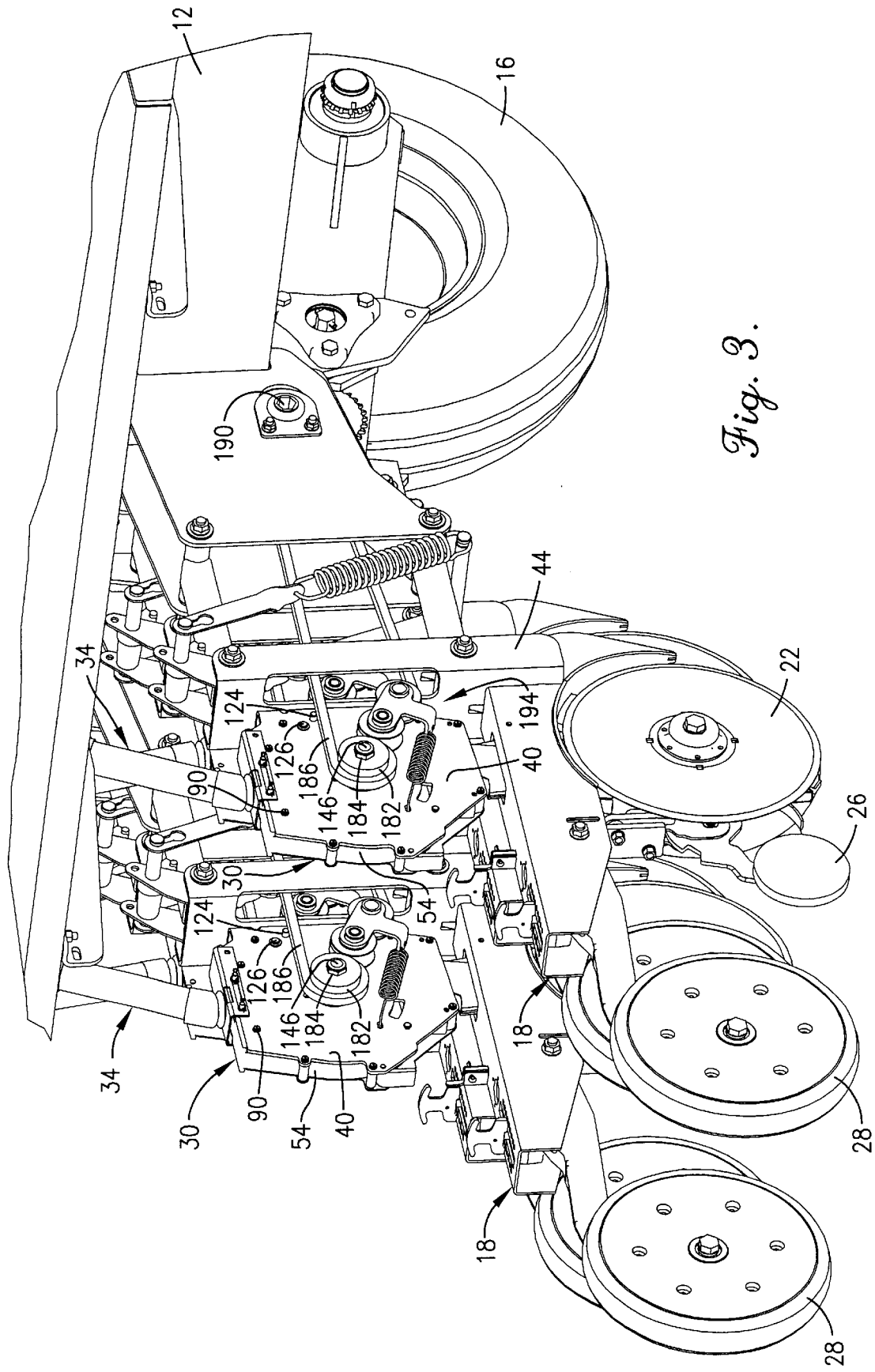
FIG. 3 is an enlarged, right rear isometric view of the machine illustrating the opposite side of two pairs of the openers and metering devices.

Referring initially to FIGS. 1, 2 and 3, a seeding machine 10 has a mobile frame 12 that is adapted to be connected to the three-point hitch of a towing tractor (not shown) for movement along a path of travel in the direction of the arrow 14 in FIG. 2. In the alternative, frame 12 may be joined with a towable hitch, adapting the unit for pull-type operation. A pair of gauge wheels 16 (only one being shown) are secured to the front side of the frame 12 for holding frame 12 at a certain selected height above the ground and driving the operating components of the machine. A series of openers 18 are attached to the rear of the frame 12 and extend in a line across the width of the machine transverse to the path of travel 14. Each opener 18 is attached to the frame 12 via linkage 20 that permits the opener to swingably shift up and down as changes in terrain are encountered relative to the gauge wheels 16.

Each opener 18 may take a variety of different forms without departing from the principles of the present invention. In the particular embodiment illustrated, the opener 18 includes a set of double disks 22 for preparing a seed trench, a seed delivery tube 24 between the disks 22 for dropping seeds into the trench, a firming wheel 26 behind the delivery tube 24 for pressing seeds down into the trench, and a press wheel 28 for closing the trench and firming down the soil on top of the deposited seeds and setting the planting depth.

In accordance with the present invention, a seed metering device 30 is mounted on each of the openers 18 for receiving seeds from an overhead bulk seed supply container 32 and delivering the metered seeds to the delivery tube 24. In the illustrated embodiment, a pair of the seed containers 32 are utilized. In accordance with the present invention, each of the metering devices 30 may be in the nature of a seed singulating device in which seeds are removed from a pool of the seeds essentially one at a time and dropped in single file order through the delivery tube 24, or each metering device may take the form of a volumetric meter in which a stream of relatively small seeds having a certain volume flow is metered through the device and into the delivery tube 24. The particular embodiment chosen for illustration herein is a singulating version of the invention.

It will be recognized that each of the metering devices 30 has its own seed supply tube 34 that connects the metering device with the bottom of the seed supply container 32 for transferring seeds by gravity from the container 32 to the metering device. Each tube 34 may take a variety of different forms without departing from certain broad principles of the present invention, including a flexible, corrugated hose. However, as will hereinafter be described in detail, it is preferred that each tube 34 take the form of a pair of relatively extendable and retractable, rigid-walled tube sections.

Each of the metering devices 30 includes a relatively thin, flat housing 36 (see also FIG. 4) that includes a pair of upright, laterally spaced apart, opposite side plates 38 and 40. The right side plate 40 includes an intumed mounting flange 42 along its front edge which serves as a means for attaching the housing 36 to an upright bar 44 of the parallel linkage 20. Bolt and nut fasteners 46 removably secure the right plate 40 to the bar 44.

Figure 5:
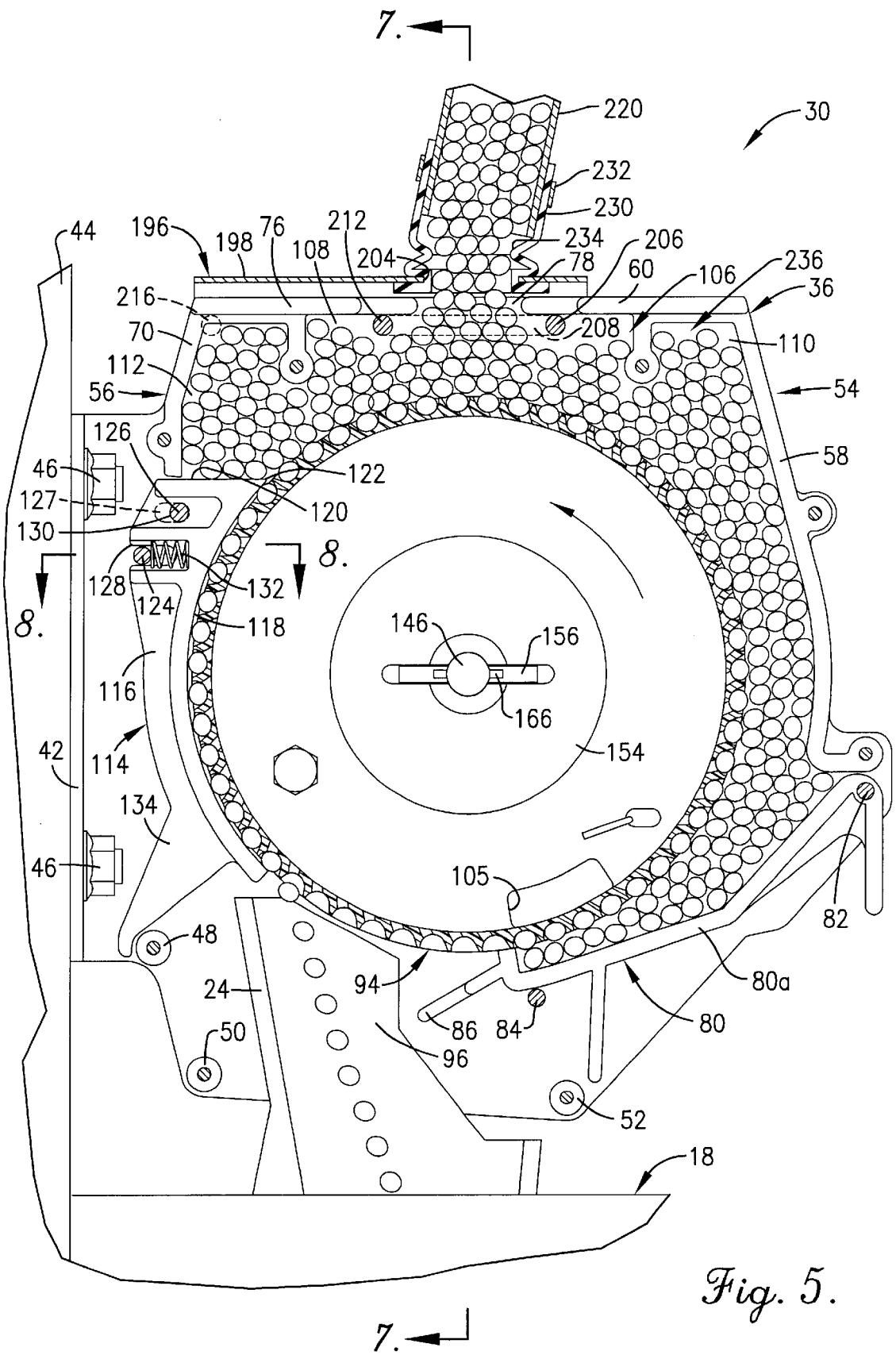
FIG. 5 is an enlarged, fragmentary, vertical cross-sectional view of one of the metering devices as viewed from the left side of the machine and illustrating the inlet gate in an open position to permit the ingress of seeds into the metering device.
Figure 6:
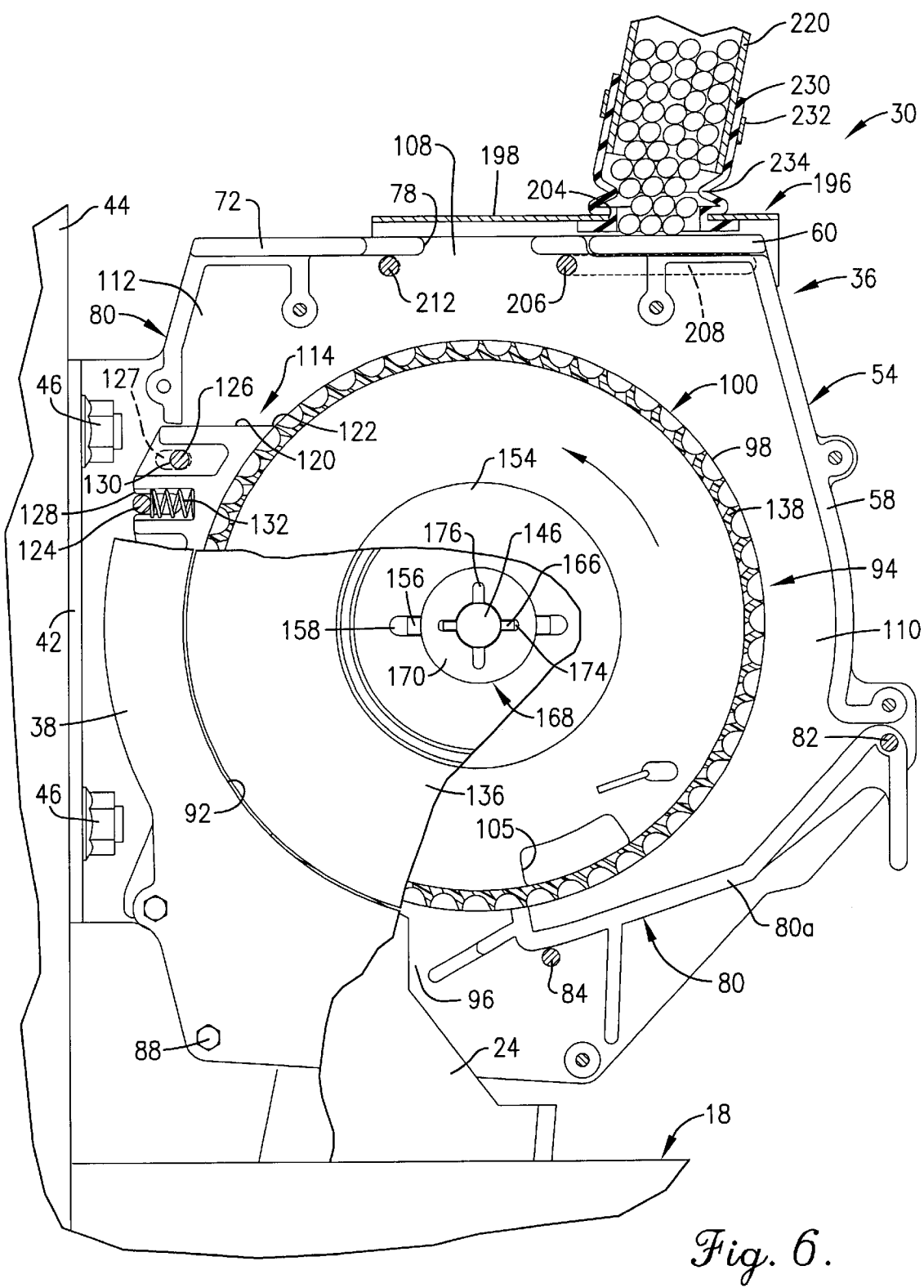
FIG. 6 is a cross-sectional view similar to FIG. 5 but showing the inlet gate in a closed position.

The plates 38 and 40 are maintained in a spaced apart condition by a plurality of spacers 48, 50 and 52, by a relatively narrow back piece 54 of Nylon material or the like, and a relatively narrow front piece 56 of Nylon or other suitable material (see also FIGS. 5 and 6). The back piece 54 has a generally upright, slightly bowed main portion 58 that presents a back wall of the housing 36, and also includes a generally horizontally extending top portion 60 that projects horizontally forwardly from the upper end of the upright portion 58. The top portion 60 includes not only a spacing section 62 that fits between the two opposing plates 38 and 40, but also a flat, horizontally extending cap 64 that overlies the upper edges of the plates 38,40 and projects slightly laterally outwardly therefrom in opposite lateral directions. The cap 64 terminates rearwardly of the midpoint of the housing and is notched at its forward extremity to present notches 66 and 68. Similarly, the front piece 56 includes a main, generally upright, slightly bowed portion 70 that functions as a partial front wall of the housing, and a top portion 72 projecting rearwardly from the upper end of the main portion 70. The top portion 72 has a spacing section thereof designated by the numeral 74 that is clamped between the two side plates 38 and 40, as well as a flat, horizontally extending cap 76 that overlies the upper edges of the side plates 38,40. The cap 76 terminates slightly forwardly of the midpoint of the housing so as to be spaced from the rear cap 64. Such spaced relationship between the caps 64 and 76 causes an inlet 78 to be presented in the top of the housing directly above the fore-and-aft center thereof. Like the cap 64, the cap 72 is notched at its rear end to present a pair of notches 79 and 81 aligned with the corresponding rear notches 66 and 68 respectively.

The housing 36 also includes a bottom piece 80 of slightly concave configuration and constructed from Nylon and other suitable material. The bottom piece 80 is not clamped tightly between the two side plates 38,40 as are the back piece 54 and front piece 56; instead, it is slightly narrower than the space between the plates 38, 40 and is swingably mounted to the two plates by a transverse pin 82 at the upper end of the bottom piece 80. A removable cross pin 84 (see FIGS. 5 and 6) underlies the bottom piece 80 and retains it up in an operating position as illustrated in FIGS. 5 and 6. When the cross pin 84 is removed, the bottom piece 80 is free to swing downwardly about the axis of pivot pin 82 in a counter-clockwise direction viewing FIGS. 5 and 6 until a lowermost lip 86 on the bottom piece 80 comes into engagement with the spacer 52. In this lowered position, the bottom piece 80 functions as an opened clean out door allowing seeds within the housing to be dumped instantly therefrom, as will hereinafter become apparent.

The side plates 38 and 40 of the housing 36 are held together by a first series of screws 88 on the left side plate 38, and a second series of screws 90 on the right side plate 40. The left screws 88 are threaded into the left ends of the spacers 48, 50, 52 and receiving portions of the back piece 54 and the front piece 56. Correspondingly, the right screws 90 are threaded into the right ends of the spacers 48, 50, 52 and proximal right end portions of the back piece 54 and the front piece 56. The left side plate 38 has a large circular access opening 92 therein.

A metering wheel 94 is rotatably supported within the housing 36 between the upper inlet 78 and an outlet 96 defined at the bottom of the housing just forwardly of the lip 86 of bottom piece 80. The wheel 94 is adapted to rotate in a counterclockwise direction within the housing as viewed in FIGS. 5 and 6 and to singulate seeds received from the seed container 32 before discharging them in succession into the drop tube 24 via the outlet 96.

With particular reference to FIGS. 4–10, it will be seen that the wheel 94 has an outermost, circumferentially extending, peripheral edge 98 that is provided with a plurality of seed receiving pockets 100 therein. In the illustrated embodiment, two rows of such pockets 100 are illustrated, but it is within the scope of the present invention to have only a single row of such pockets or more than two rows if desired. Further, the pockets do not necessarily have to be aligned in rows. As illustrated in FIGS. 9 and 10, each of the pockets 100 is slanted forwardly to a slight extent with respect to the direction of travel of the wheel so that the pockets are not radial. Each of the pockets 100 has a concave floor 102. A cleanout orifice 104 is provided in the floor of each pocket 100 so as to communicate each corresponding pocket with the interior of the wheel as will hereinafter be explained. A trash discharge outlet 105 in the side plate 40 allows dust and other residue from the seed pocket orifices 104 to drop from the metering device. Each of the pockets 100 is preferably slightly shallower than the maximum transverse dimension of seeds to be metered by the metering device 30.

The wheel 94 is of such diameter that its peripheral edge 98 is spaced below the inlet 78 of the housing and somewhat inward of the back piece 54 and the top piece 56. Consequently, the wheel 94 and the housing 36 cooperate to define a seed chamber 106 that is located primarily, but not entirely, above the wheel 94. As illustrated best in FIGS. 5 and 6, the chamber 106 includes an overhead portion 108 that is directly above the wheel 94 and below the inlet 78, an upsweep portion 110 communicating with the overhead portion 108 and extending downwardly therefrom on what may be termed the upsweep side of the wheel 94 with respect to its counterclockwise direction of rotation, and a downsweep portion 112 communicating with the overhead portion 108 and extending downwardly therefrom on the downsweep side of the wheel with respect to its direction of rotation. The upsweep portion 110 of the chamber 106 is defined by the space between the peripheral edge 98 of the wheel and the main portion 58 of the back piece 54, while the downsweep portion 1 12 of the chamber 106 is defined by the space between the peripheral wheel edge 98 and the main portion 70 of the top piece 80. The upsweep portion 110 is also defined in part by the space between the peripheral wheel edge 98 and the bottom piece 80, which is configured to present a slightly inturned stretch 80a that normally projects inwardly toward the peripheral edge 98 and serves to define the lower termination of the upsweep portion 110.

Best results have been obtained by having the lowermost termination of the upsweep portion 110 located at least somewhat below a vertical tangent point on the upsweep side of the wheel 94 as view in FIGS. 5 and 6. Preferably, the termination point is at approximately the five o'clock position. In addition, best results have been obtained when the termination of the downsweep portion 112 of the seed chamber is located at approximately a ten o'clock position on the downsweep side of the wheel as illustrated in FIGS. 5 and 6. This may also be described as being located at a point a short distance above a vertical tangent point on the downsweep side of the wheel. In the preferred form of the invention, the lower termination of the upsweep portion of the seed chamber and the lower termination of the downsweep portion of the seed chamber are located slightly more than 215° apart so that seeds within the pool of seeds collecting in the chamber 106 are exposed to approximately 70% of the circumferential dimension of the wheel during operation.

Retaining structure broadly denoted by the numeral 114 is provided inside the housing 36 along the downsweep side of the metering wheel 94 to cover pocketed seeds and keep them from leaving the pockets until the outlet 96 is reached. Such structure includes an arcuate retainer member 116 having an inside, arcuate face 118 that is complemental to the edge 98 of wheel 94. Member 116 has an uppermost shelf 120 that extends forwardly from the rear of the member to intersect with the arcuate face 118 at a point or knife edge 122, it being understood that the member 116 corresponds in width to the wheel edge 98 (see also FIG. 8). The knife edge 122 and shelf 120 are located at, and effectively define, the lower termination of the downsweep portion 112 of the seed chamber. The knife edge 122 helps separate seeds in the pockets 100 from other seeds in the seed pool.

Figure 4:
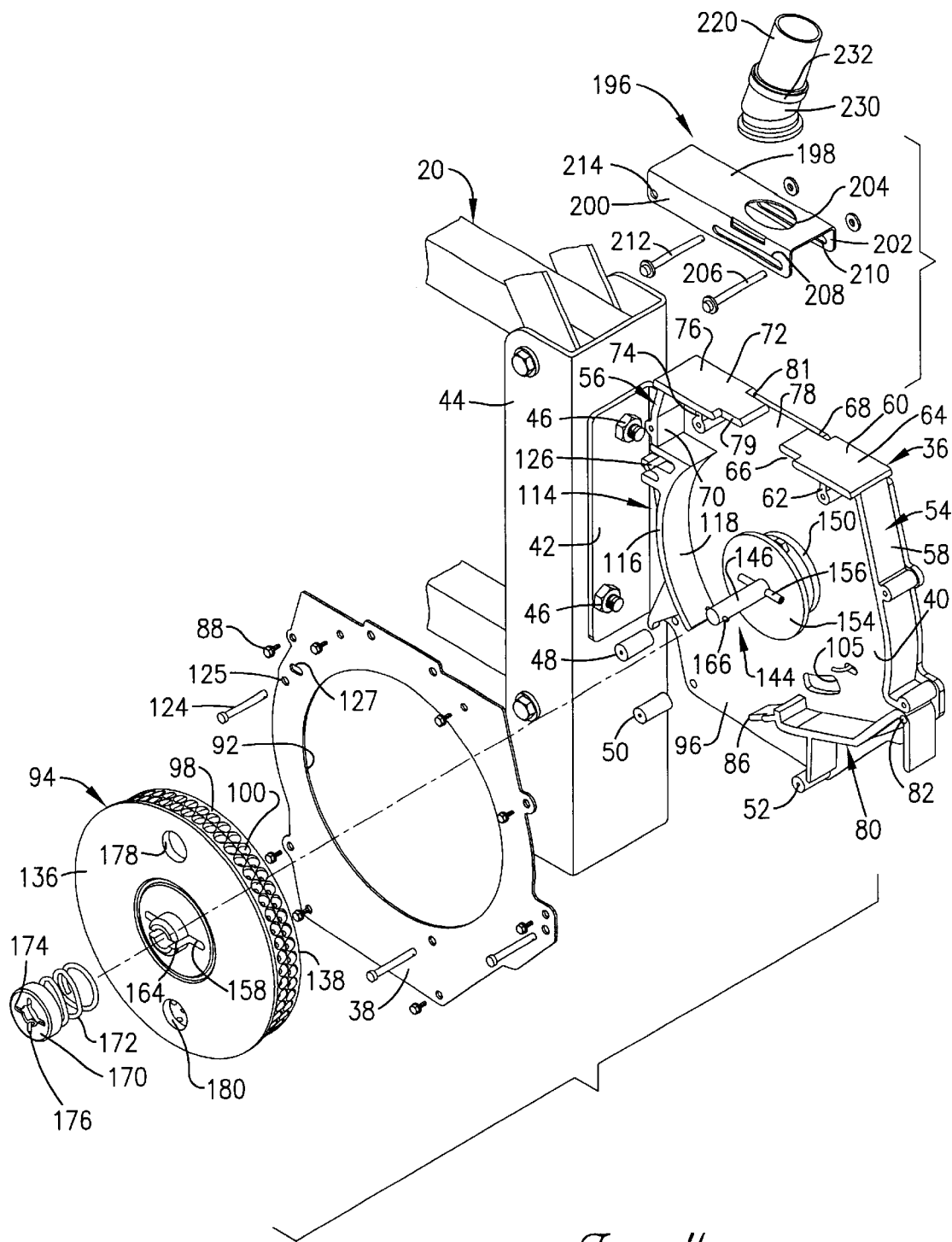
FIG. 4 is a further enlarged, fragmentary, exploded view of one of the metering devices.

The retaining structure 114 further includes a pair of cross pins 124 and 126 that span the side plates 38,40 and serve as supports for the retainer member 116. The lower cross pin 124 is received within and confined against fore-and-aft movement by a pair of mating, circular holes 125 in side plates 38 and 40 of the housing 36 (FIGS. 4 and 8). The upper cross pin 126 is received within a pair of fore-and-aft elongated, horizontal slots 127 in side plates 38,40 (FIGS. 4, 5, and 6). Adjacent its upper end, the member 116 has a fore-and-aft, open-ended slot 128 that receives the lower cross pin 124, and a circular, transverse hole 130 that receives the upper cross pin 126. This arrangement adapts the member 116 for in and out movement relative to the edge of the wheel. The pins 124 and 126 are located above the axis of rotation of wheel 94 such that in and out movement of the member 116 is along a horizontal path of travel located generally above the axis of rotation of the wheel.

The retaining structure 114 further includes a pair of coil compression springs 132 trapped between the lower cross pin 124 and a front surface of the member 116 for the purpose of yieldably biasing the member 116 toward the wheel 94. The elongated nature of the slots 127 in side plates 38,40 and slot 128 in member 116 permits the member 116 to move not only toward or away from the wheel 94, but also to rock about either of the pins 124,126 in the appropriate direction as may be necessary to pass an obstruction or the like through the interface between the member 116 and wheel edge 98 during operation. A rigid, downwardly projecting tail 134 adjacent the lower end of the member 116 is disposed for engagement with the spacer 48 to limit inward movement of the member 116, such limitation of movement being particularly beneficial when replacing the seed wheel 94 after it has been removed for servicing or otherwise. The tail 134 is also engageable with the inturned flange 42 to prevent member 116 from moving too far away from wheel edge 98 during operation.

The metering wheel 94 is generally dish-shaped, presenting a circular, flat back wall 136 and a continuous, circumferentially extending sidewall 138 that projects out of the plane of the back wall 136 to define the edge 98 of the wheel. Thus, the back wall 136 and the sidewall 138 cooperate to define a hollow interior region or cavity 140 that is circumscribed by the sidewall 138. The width of the sidewall 138 is such that when the wheel 94 is fully received within the housing, the outer surface of the back wall 136 is generally flush with the plate 38, but preferably is disposed slightly outboard of the plate 38 as shown best in FIG. 7. The wheel 94 is provided with a circumferential lip 142 at the intersection of the back wall 136 with the sidewall 138 such that the outer diameter of the lip 142 slightly exceeds the outer diameter of the sidewall 138. Lip 142 is vertically aligned with the access opening 92 of plate 38 such that the wheel edge 98 is slightly recessed with respect to the circular inside edge of the opening 92. Thus, there is adequate clearance between the edge of the opening 92 and the outer surfaces of the pocketed seeds in the event that the metering wheel 94 needs to be removed from the housing 36 while seeds are still contained within some of the pockets 100.

The wheel 94 is rotatably mounted on the housing 36 by an axle assembly broadly denoted by the numeral 144. Assembly 144 includes an axle 146 that projects completely through the housing 36 and exits from opposite sides thereof A bearing unit 148 comprising part of the assembly 144 is bolted to the interior surface of the side plate 40 and journals the axle 146 for rotation relative to the housing 36. A flange 150 of the bearing unit 148 provides a surface that fastening bolts 152 can bear against in securing the bearing unit to the side plate 40. A circular backing plate 154 is secured to the axle 146 for rotation therewith within the housing 36. A roll pin 156 extending transversely through the axle 146 is located just outboard of the backing plate 154 and is received within a mating keyway 158 in the back wall 136 of the wheel 94 so as to drivingly connect the wheel with the axle 146. An outwardly projecting boss 160 on the back wall 136 has a central bore 162 that slidably receives the axle 146 to permit mounting and removal of the wheel 94 from the axle 146. The boss 160 has a cross slot 164 therein that is aligned with the keyway 158, such cross slot 164 permitting the passage through boss 160 of a small transverse roll pin 166 at the outer end of the axle 146 when the slot 164 is aligned with the roll pin 166 and the wheel is being removed from or installed on the axle 146.

Wheel 94 is retained on the axle 146 by a coupling assembly broadly denoted by the numeral 168. The assembly 168 includes three major components, i.e., a retainer cap 170, a compression spring 172, and the roll pin 166 at the outer end of the axle 146. The cap 170 is removably secured to the axle 146 by what may be termed a bayonet style coupling that includes the roll pin 166 and a transverse slot 174 in the cap 170. The slot 174 allows passage therethrough of the roll pin 166 when the roll pin 166 is aligned with the slot 174, but when the cap 170 is rotated 90°, or one-quarter turn, with the cross pin 166 on the exterior thereof, the cap will be locked against escape from the end of the axle 146. Preferably, a pair of indentations 176 that are 90° out of alignment with the transverse slot 174 provide a seat for the roll pin 166 when the cap 170 is in its locked position. It will be appreciated further that the coil spring 172 between the interior of the cap 170 on the one hand and the back wall of the wheel 94 on the other hand keeps the wheel 94 in its proper working position within the housing 36 and the roll pin 166 firmly seated within the indentations 176.

The cap 170 is in the nature of a component that can be manipulated by hand, without the use of hand tools, to facilitate removal. Similarly, the back wall 136 of the metering wheel 94 is provided with a pair of grip openings 178 and 180 that are spaced apart such a distance that the operator can insert his thumb and one finger after the retaining cap 170 and spring 172 have been removed, thus providing a good manual grip on the wheel 94 for pulling it off the axle 146. Such gripping holes 178 and 180 are also useful during reinstallation of the wheel 94.

On the right side of the housing 36, the axle 146 carries a sprocket 182 that is keyed to the axle 146 in a suitable manner such that the sprocket 182 and the axle 146 rotate together. The right end of the axle 146 is threaded and carries a nut 184 to removably secure the sprocket onto the axle 146. Each of the meters 30 is driven by a drive chain 186 (FIG. 3) that entrains the sprocket 182 of the meter for the purpose of rotating the metering wheel 94 thereof. Each drive chain 186 extends forwardly to another sprocket 188 (FIG. 2) on a common transverse drive shaft 190 for all of the meters 30. The common shaft 190, in turn, is ground-driven via a chain and sprocket assembly 192 (FIG. 2) operably connected with one of the gauge wheels 16. A spring loaded tensioner assembly 194 associated with each drive chain 186 maintains appropriate tension in the chain 186 during operation.

As illustrated in particular in FIGS. 3–7, each meter housing 36 is provided with a selectively shiftable cover slide 196 that functions as a gate to open or close the inlet 78 depending upon the position of slide 196. As illustrated, the cover slide 196 is generally transversely U-shaped, having a top wall 198 and a pair of laterally spaced apart sidewalls 200 and 202 integral with the top wall 198 and depending therefrom. The cover slide 196 overlies the caps 64 and 76 of the back piece 54 and front piece 56 respectively, and sidewalls 200,202 embrace opposite edges of the caps 60,76. A hole 204 in the top wall 98 is either aligned with the inlet 78 when the cover slide is in the forward, open position of FIG. 5, or is out of alignment with the inlet 78 when the cover slide is in the rearward, closed position of FIG. 6. A rear cross pin 206 passes through a pair of aligned slots 208 and 210 in the depending sidewalls 200,202 respectively, and also through appropriate holes in the side plates 38 and 40 of the housing 36, so as to serve as a means for guiding the cover slide 196 in its fore-and-aft movement between its opened and closed positions. The cross pin 206 is at the rear of the slots 208,210 when the cover slide 196 is in its opened position of FIG. 5, and is at the front of the slots 208,210 when the cover slide 196 is in its closed position of FIG. 6. A removable locking pin 212 also passes through the slots 208,210 and aligned holes in the side plates 38,40 for the purpose of selectively retaining the cover slide 196 in either of its two extreme positions. When the locking pin 212 is received in the slots 208,210, it holds the cover slide 196 against movement out of its opened position of FIG. 5. On the other hand, when the cover slide 196 is in its closed position of FIG. 6, the locking pin 212 may pass through not only appropriate holes in the housing 36, but also a pair of locking holes 214 and 216 (FIGS. 4 and 5) in the front end of the sidewalls 200,202 of cover slide 196 to hold slide 196 in the closed position.

Figures 11, 12:
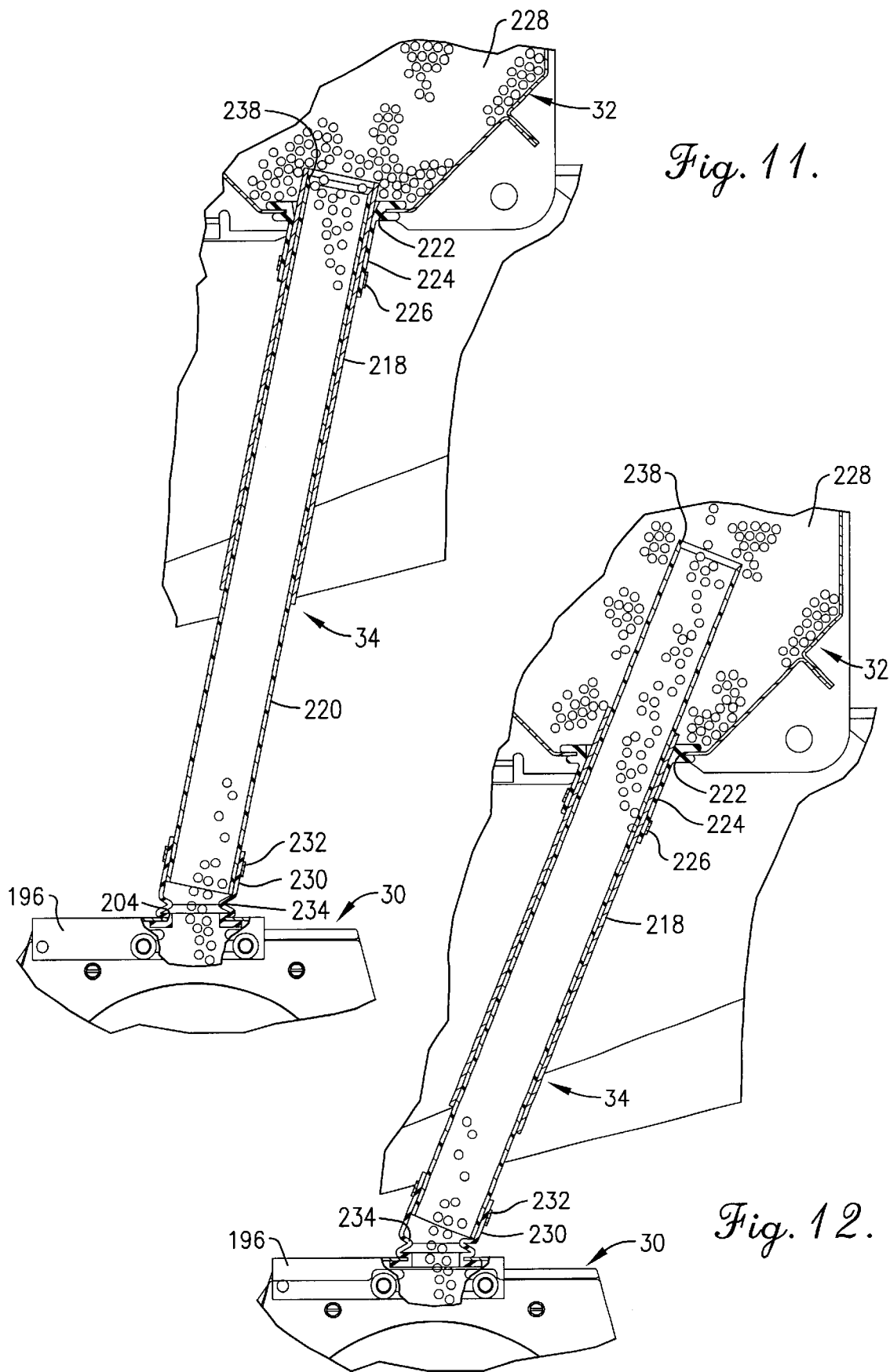
FIG. 11 is an enlarged, fragmentary cross-sectional view of the container metering device and supply tube showing the condition of the parts when the opener is in a typical operating position approximately midway between its upper and lower limits of travel.
FIG. 12 is a similar enlarged cross-sectional view showing the condition of the parts when the opener is at the upper limit of its path of travel.
Figure 13:
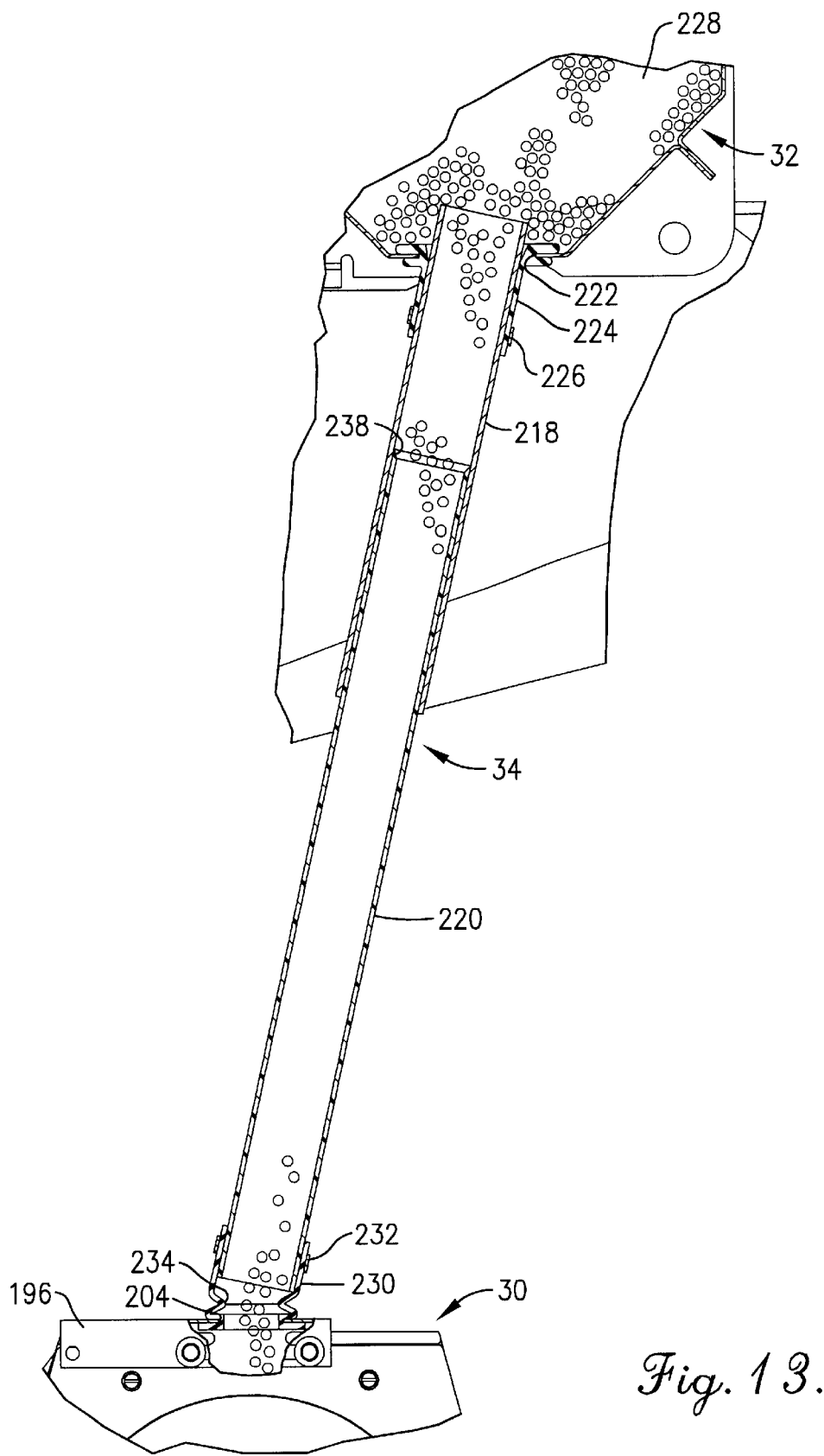
FIG. 13 is an enlarged cross-sectional view similar to FIGS. 11 and 12 but showing the condition of the parts when the opener is at its lower limit of travel relative to the overhead container.

Turning to specific features of the seed supply tubes 34 as shown particularly in FIGS. 11–13, it will be noted that each tube 34 is extendable and retractable, is relatively stiff-walled, and establishes continuously open communication between the container 32 and the corresponding metering device 30 so that seeds are constantly supplied to the opener 18. Each supply tube 34 includes an upper cylindrical section 218 secured to the container 32 and a lower cylindrical section 220 secured to the metering device 30. In the preferred embodiment, the extension and retraction of the supply tube 34 is accomplished by having the lower section 220 telescopically received within the upper section 218. Also in a preferred form of the invention, the upper section 218 is metallic, while the lower section 220 is plastic.

The container 32 has a series of outlet holes in the bottom thereof corresponding in number to the number of openers 18. The holes are aligned with the openers directly above the corresponding metering device 30. One of such outlet holes is illustrated in FIGS. 11–13 and is denoted by the numeral 222. Each hole 222 has a resilient upper grommet 224 received therein and essentially fixedly attached to the container 32. The upper end of the upper tube section 218 is received within the grommet 224 and is retained in that position by a hose clamp 226 (see also FIGS. 2 and 4). The uppermost extremity of the upper tube section 218 projects through the grommet 224 and slightly there beyond into the interior 228 of the container 32.

On the other hand, the hole 204 in cover slide 196 of metering device 30 receives a lower resilient grommet 230. The lower grommet 230 is fitted into the hole 204 in such a manner that the grommet 230 is essentially fixed to the metering device 30, although the grommet can of course be removed and replaced when its useful life is completed. The grommet 230 receives the lower end of the lower tube section 220, and a lower hose clamp 232 retains the lower tube section 220 within the grommet 230. The annular, resilient sidewall of the lower grommet 230 has one or more bellows 234 formed therein to provide a slight degree of angular flexibility during use. As shown, the lowermost extremity of the lower tube section 220 terminates within the grommet 230, slightly above the hole 204 in the cover slide 196.

The lower tube section 220 is considerably longer than the upper tube section 218 so as to accommodate a full range of up and down motion of the opener 18 during field operations. In the preferred embodiment, the opener 18 has about 10 inches of travel, and the lower tube section 220 is approximately 42% longer than the upper tube section 218. These lengths are so selected that when the opener 18 is at the upper end of its range of motion as illustrated in FIG. 12, the lower edge of the upper tube section 218 remains spaced a distance above the metering device 30 so as to not interfere with upward travel of the opener 18. On the other hand, when the opener 18 is at the lower end of its travel as illustrated in FIG. 13, the lower tube section 220 does not slip out of the upper tube section 218.

OPERATION

As the machine 10 moves forwardly in the direction of the arrow 14 as illustrated in FIG. 2, seeds within the containers 32 are constantly supplied by gravity to the meters 30 of the various openers 18 via the supply tubes 34. If need be, the openers 18 can rise and fall relative to the frame 12 as their press wheels 28 encounter changes in the terrain that may be somewhat different than those encountered by the gauge wheels 16. Moreover, each of the openers 18 can rise and fall independently of all of the other openers 18 so as to accommodate changes in terrain across the width of the machine.

Depending upon the row spacing desired, all or only certain ones of the metering devices 30 may be placed in an operating mode. One selectable arrangement is to have alternate ones of the metering devices in operation. Another is to have the machine set up in a "paired row" configuration in which every third metering device is disabled so that successive pairs of closely spaced, seed-containing rows are separated in each case by an individual, seedless row. Those metering devices 30 intended to dispense seeds should have their cover slides 196 latched in the opened position of FIG. 5, while those intended to be disabled should have their cover slides 196 latched in the closed position of FIG. 6.

With respect to those metering devices 30 having their cover slides 196 in the opened position of FIG. 5, seeds gravitate through the inlet opening 78 of the meter and collect in a seed pool 236 within the seed chamber 106. As the metering wheel 94 rotates in a counterclockwise direction viewing FIG. 5, empty seed pockets 100 along the lower stretch of the wheel successively come into contacting engagement with seeds in the upsweep portion 110 of the chamber 106. Some of the pockets 100 may become filled with a seed immediately upon the first opportunity for a seed to enter such pocket. On the other hand, other pockets may not receive seeds until much later in the circular path of travel, perhaps not until reaching the overhead portion 108 of the chamber or the downsweep portion 112 thereof. In any event, it has been found that by having the upsweep and downsweep portions of the chamber 106 terminate at the approximate five o'clock and 10 o'clock positions respectively when the meter is viewed as illustrated in FIG. 5, there is a strong likelihood that all pockets will be filled with seeds so that no skips are caused.

On the downsweep side of the metering wheel 94, the seed-filled pockets 100 pass beneath the retaining member 116 to prevent premature escape of the captured seeds from the pockets. As the seed-filled pockets reach approximately the 7 o'clock position in FIG. 5, they become uncovered by the retainer member 116 and are free to gravitate directly into the open upper end of the seed delivery tube 24. Thereafter, the empty pockets continue on around across the lower portion of the wheel and commence another upsweep, where they once again encounter the awaiting seed pool 236.

In the event that oversized seeds or debris pass under the retainer member 116, the relief springs 132 permit the member 116 to rock slightly away from the wheel as may be necessary to allow such oversized seed or debris to pass through the meter without harm. Note in this respect that if the retainer member 1 16 needs to rock back away from the wheel near the top of the retainer, this is freely accommodated without simultaneously moving away the lower portions of the member 116. And, as the oversized material continues to travel downwardly along the arcuate face of the member 116, that area requiring relief simply swings out to the extent necessary. Thus, the lower portion can stay in while the upper portion moves out, and the upper portion can stay in while the lower portion moves out, resulting in a continued confinement of the those seeds where there is no obstruction.

It will be appreciated that the metering action as above described is carried out entirely without the use of positive pressure air or vacuum. Gravity alone is relied upon to deliver seeds to the metering device 30, to fill the seed pockets 100, and to then discharge the singulated seeds into the delivery tube 24. Consequently, a relatively uncomplicated, reliable and easy to use metering system is provided that also is conducive to narrow row spacing. Because the pockets 100 are on the edge 98 of the wheel 94, rather than on the face of the wheel as is the case in many conventional metering devices, the overall profile of each metering device, as viewed from the rear, can be relatively narrow. This enables more openers to be placed within the same width dimension of the machine than would otherwise be the case, which permits narrow row spacing.

Moreover, placement of the seeds on the outermost edge of each wheel 94, rather than the side face thereof, gives a lengthy circumferential dimension within which to capture the required number of seeds for feeding at a given rate of seed application. In other words, the circumference at the edge of the wheel is inherently greater than the circumference around a circle at a lesser radial distance from the center of the wheel. Consequently, there is more room for seeds in a circle at the outermost circumference of the wheel than there is in a circle nearer the center. This means that the metering wheel 30 can be rotated more slowly than would otherwise be the case, which helps assure that the seed pockets do indeed become filled with seeds during their passage through the seed pool. And, if an even greater number of seeds per revolution is desired, the number of rows of pockets on the edge of the wheel can be correspondingly increased, although it will be noted that such increase in the number of seed rows has a corresponding effect on the width of the meter.

Regarding operation of each seed supply tube 34, it should be apparent that as the machine is advanced along its path of travel in the direction of the arrow 14, seeds within the container 32 gravitationally enter the upper end of the supply tube 34 and flow downwardly therethrough into the metering device 30 of the corresponding opener 18. At the midpoint of the extent of vertical travel of the opener 18 as illustrated in FIG. 11, the uppermost extremity of the lower tube section 220 is slightly below the upper end extremity of the upper tube section 218. However, if the opener 18 encounters a rise relative to the frame 12, the metering device 30 rises accordingly, pushing the lower tube section 220 upwardly through the upper tube section 218 and further into the interior 228 of the container 32. The effective length of the tube 34, that is the distance between the bottom of the container 32 and the top of the metering device 30, thus retracts. On the other hand, when the opener 18 encounters a low spot relative to the frame 12, the metering device 30 pulls downwardly on the lower tube section 220 as illustrated in FIG. 13 to effectively extend the length of the supply tube 34. Thus, throughout the entire range of up and down travel of the opener 18, communication between the container 32 and the metering device 30 remains fully intact so that a steady, gravity-induced flow of seeds to the metering device is assured.

Note that even though the supply tube 34 is totally filled with seeds when the opener 18 is at the lower end of its travel as in FIG. 13, there will be no sagging or bowing of the tube 34 under the influence of the weight of seeds within the tube 34 when the opener then rises to its upper limit of travel. Due to the relative stiff-walled nature of the tube sections 218 and 220, as the metering device rises the lower tube section 220 simply telescopes up into the upper tube 218, carrying with it all the seeds in the lower tube section. Consequently, the force of gravity can keep the seeds flowing to the metering device 30 at all points in the up and down travel of the opener 18.

It has been found that having the upper tube section 218 constructed of metal instead of plastic helps assure that the lower tube section 220 can slide freely within the upper tube section 218 even though dust particles may work their way into the sliding interface between the tube sections. Preferably, the upper extremity of the lower tube section 220 has a bevel 238 to help direct small particles or debris from the container 32 and the upper tube section 218 into the interior confines of the lower tube section 220, rather than allow such materials to slip down into the interface between the two tube sections.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the doctrine of equivalents to determine and assess the reasonably fair scope of his invention as pertains to any apparatus not materially departing from but outside the literal scope of the invention as set out in the following claims.

What is claimed is:

1. In a machine for depositing seeds beneath the surface of the ground, the improvement comprising:
   a mobile frame;
   a bulk seed container carried on said frame;
   a plurality of ground-engaging openers supported on said frame below the container for receiving seeds therefrom,
   said openers being independently shiftable up and down relative to one another and the container as the machine moves along a path of travel;
   a separate seed metering device on each of said openers; and
   a plurality of seed supply tubes connected between said container and the metering devices of said plurality of openers.

2. In a machine as claimed in claim 1,
   each of said metering devices including,
      a top-loading housing having an upper seed inlet and a lower seed outlet;
      a metering wheel rotatable within said housing about a horizontal axis between said inlet and outlet and having a radially outermost, circumferential, transversely extending peripheral edge,
      said wheel being spaced below said inlet to cooperate with said housing in defining a gravitationally fed seed chamber for holding a collected pool of seeds in contact with the rotating edge of the wheel,
      said edge of the wheel having a plurality of generally radially outwardly facing seed-receiving pockets for capturing seeds therein as the edge slides against the pool of seeds in the chamber during rotation of the wheel; and
      retaining structure on a downwardly moving side of the wheel having a radially inwardly directed, arcuate face covering a sufficient portion of the edge of the wheel as to prevent gravitational discharge of captured seeds from the pockets until the pockets arrive at the outlet.

3. In a machine as claimed in claim 2,
   said retaining structure including a retainer member provided with said arcuate face, guide apparatus adapting said member for shifting movement toward and away from the edge of the wheel, and a spring yieldably biasing the member toward the wheel.

4. In a machine as claimed in claim 3,
   said guide apparatus being operable to limit said shifting movement of the retainer member to movement along a path of travel disposed above the axis of rotation of said wheel.

5. In a machine as claimed in claim 4,
   said guide apparatus further being operable to allow the retainer member to rock in a compensating motion as seeds contained within pockets of the rotating wheel contact and push outwardly on the arcuate face of the member.

6. In a machine as claimed in claim 5,
   said guide apparatus comprising vertically spaced, horizontally extending pins and slots between the housing and the member.

7. In a machine as claimed in claim 2,
   said housing including a gate selectively shiftable between an open position opening said inlet and a closed position closing said inlet.

8. In a machine as claimed in claim 2,
   said seed pockets being arranged in a plurality of circumferentially extending rows.

9. In a machine as claimed in claim 2,
   each of said pockets being slightly shallower than the maximum transverse dimension of seeds intended to be metered by the wheel so that a seed received within a pocket projects slightly outwardly beyond the edge of the wheel.

10. In a machine as claimed in claim 9,
    each of said pockets being inclined forwardly with respect to the direction of rotation of the wheel.

11. In a machine as claimed in claim 10,
    said wheel being generally concave, having a flat, circular back wall and a continuous annular sidewall fixed to and projecting out of the plane of said back wall to define a dished out interior,
    said edge of the wheel being on said sidewall,
    said pockets each having a floor provided with a hole that communicates the exterior of the wheel with the interior of the wheel,
    said housing having at least one trash discharge outlet therein communicating with said interior of the wheel.

12. In a machine as claimed in claim 2, said chamber including an overhead portion directly above the wheel, an upsweep portion communicating with the overhead portion and located on the upwardly rotating upsweep side of the wheel, and a downsweep portion communicating with the overhead portion and located on the downwardly rotating downsweep side of the wheel, said upsweep portion of the chamber having its lower termination point located below a vertical tangent point on the upsweep side of the wheel, said downsweep portion of the chamber having its lower termination point located above a vertical tangent point on the downsweep side of the wheel, said arcuate face of the retaining structure covering the edge of the wheel from the termination of the downsweep portion of the chamber to said outlet.

13. In a machine as claimed in claim 12, said termination point of the upsweep portion of the chamber being located approximately 170° before top center with respect to the direction of rotation of the wheel, said termination point of the downsweep portion of the chamber being located approximately 45° after top center with respect to the direction of rotation of the wheel.

14. In a machine as claimed in claim 13, said retaining structure including a retainer member provided with said arcuate face, guide apparatus adapting said member for shifting movement toward and away from the edge of the wheel, and at least one spring yieldably biasing the member toward the wheel.

15. In a machine as claimed in claim 14, each of said pockets being slightly shallower than the maximum transverse dimension of seeds intended to be metered by the wheel so that a seed received within a pocket projects slightly outwardly beyond the edge of the wheel.

16. In a machine as claimed in claim 15, each of said pockets being inclined forwardly with respect to the direction of rotation of the wheel.

17. In a machine as claimed in claim 2, said chamber of each metering device being approximately the same width as the wheel of the device.

18. In a machine as claimed in claim 2, each of said metering devices including an inlet gate selectively shiftable between an open position permitting seed flow into the metering device from the container and a closed position preventing such flow.

19. In a machine as claimed in claim 18, said housing including an upright sidewall having an access hole slightly larger in diameter than the wheel and through which the wheel may be inserted into and removed from the housing, said device further including a transverse, horizontal drive shaft in the housing projecting outwardly through said access hole, and a releasable coupling assembly removably securing the wheel to said drive shaft.

20. In a machine as claimed in claim 19, said drive shaft passing through said wheel and having an outer end projecting outwardly beyond the wheel, said releasable coupling assembly including a wheel-engaging backstop secured to the drive shaft adjacent to an inner end of the drive shaft to limit inward movement of the wheel along said drive shaft, a locking cap on said outer end of the drive shaft, a quarter-turn bayonet lock between the outer end of the drive shaft and the cap for holding the cap against axial removal from the drive shaft when the cap is in a locked rotative position and for permitting the cap to be removed axially from the drive shaft when the cap is in an unlocked, quarter-turned rotative position, and a spring captured between the cap and the wheel when the cap is in its locked position for yieldably urging the wheel against the back stop and the cap against said bayonet lock.

21. In a machine as claimed in claim 20, said bayonet lock including a cross pin on said outer end of the drive shaft and a pass-through slot on the cap configured to allow the cross pin to pass therethrough when the cap is in its unlocked position.

22. In a machine as claimed in claim 21, said cap having a cross pin-receiving indent for complementally receiving the cross pin when the cap is in its locked position.

23. In a machine as claimed in claim 1, each supply tube including a pair of relatively extendable and retractable sections for accommodating the up and down shifting of the corresponding opener without interrupting communication between the container and the metering device of the opener.

24. In a machine as claimed in claim 23, an upper one of said sections being attached to the container and a lower one of said sections being attached to the metering device.

25. In a machine as claimed in claim 24, said sections being mutually telescopic.

26. In a machine as claimed in claim 25, said lower section being telescopically received within said upper section.

27. In a machine as claimed in claim 26, said upper section being metallic, said lower section being plastic.

28. In a machine as claimed in claim 26, said container having a seed discharge hole and a resilient upper grommet retained within said hole, said upper section of the supply tube being received within and secured to said upper grommet.

29. In a machine as claimed in claim 28, said metering device having a seed inlet opening and a resilient lower grommet retained within said opening, said lower section of the supply tube being received within and secured to said lower grommet.

30. In a machine as claimed in claim 29, said lower grommet including a tubular sidewall, said sidewall having a set of bellows as a part thereof.

31. In a machine as claimed in claim 23, said sections being mutually telescopic.

32. In a machine as claimed in claim 23, an upper one of said sections being metallic, a lower one of said sections being plastic.

33. In a machine as claimed in claim 23, an upper one of said sections being attached to the container and a lower one of said sections being attached to the metering device, said lower section being telescopically received within the upper section, said lower section being longer than the upper section, the lengths of the sections being so selected that the upper section does not interfere with the metering device when the opener shifts to its upper limit of travel yet the lower section does not withdraw from the upper section when the opener shifts to its lower limit of travel.

34. In a machine as claimed in claim 23,
said container having a seed discharge hole and a resilient upper grommet retained within said hole,
said upper section of the supply tube being received within and secured to said upper grommet.

35. In a machine as claimed in claim 34,
said metering device having a seed inlet opening and a resilient lower grommet retained within said opening,
said lower section of the supply tube being received within and secured to said lower grommet.

36. In a machine as claimed in claim 35,
said lower grommet including a tubular sidewall,
said sidewall having a set of bellows as a part thereof.

37. In a machine as claimed in claim 1,
each of said metering devices including an inlet gate selectively shiftable between an open position permitting seed flow into the metering device from the container and a closed position preventing such flow.

38. In a mechanical seed metering device, the improvement comprising:
a top-loading housing having an upper seed inlet and a lower seed outlet;
a metering wheel rotatable within said housing about a horizontal axis between said inlet and outlet and having a radially outermost, circumferential, transversely extending peripheral edge,
said wheel being spaced below said inlet to cooperate with said housing in defining a gravitationally fed seed chamber for holding a collected pool of seeds in contact with the rotating edge of the wheel,
said chamber including an overhead portion directly above the wheel, an upsweep portion communicating with the overhead portion and located on the upwardly rotating upsweep side of the wheel, and a downsweep portion communicating with the overhead portion and located on the downwardly rotating downsweep side of the wheel,
said upsweep portion of the chamber having its lower termination point located below a vertical tangent point on the upsweep side of the wheel,
said downsweep portion of the chamber having its lower termination point located above a vertical tangent point on the downsweep side of the wheel,
said edge of the wheel having a plurality of generally radially outwardly facing seed-receiving pockets for capturing seeds therein as the edge slides against the pool of seeds in the chamber during rotation of the wheel; and
retaining structure on the downsweep side of the wheel having a radially inwardly directed, arcuate face covering the edge of the wheel from the termination of the downsweep portion of the chamber to said outlet for preventing gravitational discharge of captured seeds from the pockets until they arrive at the outlet.

39. In a mechanical seed metering device as claimed in claim 38,
said termination points of the upsweep and downsweep portions of the chamber being at least 180° separated from one another with respect to the direction of rotation of the wheel.

40. In a mechanical seed metering device as claimed in claim 39,
said termination point of the upsweep portion of the chamber being located approximately 170° before top center with respect to the direction of rotation of the wheel,
said termination point of the downsweep portion of the chamber being located approximately 45° after top center with respect to the direction of rotation of the wheel.

41. In a mechanical seed metering device as claimed in claim 38,
said retaining structure including a retainer member provided with said arcuate face, guide apparatus adapting said member for shifting movement toward and away from the edge of the wheel, and a spring yieldably biasing the member toward the wheel.

42. In a mechanical seed metering device as claimed in claim 41,
said guide apparatus being operable to limit said shifting movement of the retainer member to movement along a path of travel disposed above the axis of rotation of said wheel.

43. In a mechanical seed metering device as claimed in claim 42,
said guide apparatus further being operable to allow the retainer member to rock in a compensating motion as seeds contained within pockets of the rotating wheel contact and push outwardly on the arcuate face of the member.

44. In a mechanical seed metering device as claimed in claim 43,
said guide apparatus comprising vertically spaced, horizontally extending pins and slots between the housing and the member.

45. In a mechanical seed metering device as claimed in claim 38,
said housing including a gate selectively shiftable between an open position opening said inlet and a closed position closing said inlet.

46. In a mechanical seed metering device as claimed in claim 38,
said seed pockets being arranged in a plurality of circumferentially extending rows.

47. In a mechanical seed metering device as claimed in claim 38,
each of said pockets being slightly shallower than the maximum transverse dimension of seeds intended to be metered by the wheel so that a seed received within a pocket projects slightly outwardly beyond the edge of the wheel.

48. In a mechanical seed metering device as claimed in claim 47,
each of said pockets being inclined forwardly with respect to the direction of rotation of the wheel.

49. In a mechanical seed metering device as claimed in claim 38,
said wheel being generally concave, having a flat, circular back wall and a continuous annular sidewall fixed to and projecting out of the plane of said back wall to define a dished out interior,
said edge of the wheel being on said sidewall,
said pockets each having a floor provided with a hole that communicates the exterior of the edge with the interior of the wheel, said housing having at least one trash discharge opening therein communicating with said interior of the wheel.

50. In a mechanical seed metering device as claimed in claim 38, said housing including an upright sidewall having an access hole slightly larger in diameter than the wheel and through which the wheel may be inserted into and removed from the housing, said device further including a transverse, horizontal drive shaft in the housing projecting outwardly through said access hole, and a releasable coupling assembly removably securing the wheel to said drive shaft.

51. In a mechanical seed metering device as claimed in claim 50, said drive shaft passing through said wheel and having an outer end projecting outwardly beyond the wheel, said releasable coupling assembly including a wheel-engaging backstop secured to the drive shaft adjacent to an inner end of the drive shaft to limit inward movement of the wheel along said drive shaft, a locking cap on said outer end of the drive shaft, a quarter-turn bayonet lock between the outer end of the drive shaft and the cap for holding the cap against axial removal from the drive shaft when the cap is in a locked rotative position and for permitting the cap to be removed axially from the drive shaft when the cap is in an unlocked, quarter-turned rotative position, and a spring captured between the cap and the wheel when the cap is in its locked position for yieldably urging the wheel against the back stop and the cap against said bayonet lock.

52. In a mechanical seed metering device as claimed in claim 51, said bayonet lock including a cross pin on said outer end of the drive shaft and a pass-through slot on the cap configured to allow the cross pin to pass therethrough when the cap is in its unlocked position.

53. In a mechanical seed metering device as claimed in claim 52, said cap having a cross pin-receiving indent for complementally receiving the cross pin when the cap is in its locked position.

54. In a machine for depositing seeds beneath the surface of the ground, the improvement comprising:

a mobile frame;

a bulk seed container carried on said frame;

a plurality of ground-engaging openers supported on said frame below the container for receiving seeds therefrom, said openers being independently shiftable up and down relative to one another and the container as the machine moves along a path of travel;

a separate metering device on each of said openers including, a top-loading housing having an upper seed inlet and a lower seed outlet, a metering wheel rotatable within said housing about a horizontal axis between said inlet and outlet and having a radially outermost, circumferential, transversely extending peripheral edge, said wheel being spaced below said inlet to cooperate with said housing in defining a gravitationally fed seed chamber for holding a collected pool of seeds in contact with the rotating edge of the wheel, said chamber including an overhead portion directly above the wheel, an upsweep portion communicating with the overhead portion and located on the upwardly rotating upsweep side of the wheel, and a downsweep portion communicating with the overhead portion and located on the downwardly rotating downsweep side of the wheel, said upsweep portion of the chamber having its lower termination point located below a point of vertical tangency on the upsweep side of the wheel with respect to the direction of rotation of the wheel, said downsweep portion of the chamber having its lower termination point located above a point of vertical tangency on the downsweep side of the wheel with respect to the direction of rotation of the wheel, said edge of the wheel having a plurality of generally radially outwardly facing seed-receiving pockets for capturing seeds therein as the edge slides against the pool of seeds in the chamber during rotation of the wheel, a retainer member on a downwardly moving side of the wheel having a radially inwardly directed, arcuate face covering the edge of the wheel from the termination of the downsweep portion of the chamber to said outlet to prevent gravitational discharge of captured seeds from the pockets until the pockets arrive at the outlet, guide apparatus adapting said member for shifting movement toward and away from the edge of the wheel, and a spring yieldably biasing the member toward the wheel, each of said pockets being slightly shallower than the maximum transverse dimension of seeds intended to be metered by the wheel so that a seed received within a pocket projects slightly outwardly beyond the edge of the wheel, each of said pockets being inclined forwardly with respect to the direction of rotation of the wheel; and a plurality of seed supply tubes connected between said container and the metering devices of said plurality of openers, each of said tubes including a pair of mutually telescopic sections, an upper one of which is connected to the container and a lower one of which is connected to the corresponding metering device, the lengths of the sections being so selected that the upper section does not interfere with the metering device when the opener shifts to its upper limit of travel yet the lower section does not withdraw from the upper section when the opener shifts to its lower limit of travel.

55. In a mechanical seed metering device, the improvement comprising:

a top-loading housing having an upper seed inlet and a lower seed outlet;

a metering wheel rotatable within said housing about a horizontal axis between said inlet and outlet and having a radially outermost, circumferential, transversely extending peripheral edge, said wheel being spaced below said inlet to cooperate with said housing in defining a gravitationally fed seed chamber for holding a collected pool of seeds in contact with the rotating edge of the wheel, said edge of the wheel having a plurality of generally radially outwardly facing seed-receiving pockets for capturing seeds therein as the edge slides against the pool of seeds in the chamber during rotation of the wheel; and a spring-loaded, rigid retaining structure downstream from said chamber with respect to the direction of rotation of the wheel and covering the edge of the wheel in disposition for preventing gravitational discharge of captured seeds from the pockets until they arrive at the outlet, said retaining structure being yieldably movable away from the wheel to permit passage between the wheel and the structure of oversized obstructions.

56. In a mechanical seed metering device, the improvement comprising:

a top-loading housing having an upper seed inlet and a lower seed outlet;

a metering wheel rotatable within said housing about a horizontal axis between said inlet and outlet and having a radially outermost, circumferential, transversely extending peripheral edge, said wheel being spaced below said inlet to cooperate with said housing in defining a gravitationally fed seed chamber for holding a collected pool of seeds in contact with the rotating edge of the wheel, said edge of the wheel having a plurality of generally radially outwardly facing seed-receiving pockets for capturing seeds therein as the edge slides against the pool of seeds in the chamber during rotation of the wheel; and a gate selectively positionable in an open position opening said inlet and a closed position closing said inlet.

57. In a mechanical seed metering device as claimed in claim 56, said housing having a top surface adjacent said inlet, said gate having a hole disposed for registration with said inlet whereby to open the same when the gate is in said open position and for registration with said surface whereby to close the inlet when the gate is in said closed position.

58. In a mechanical seed metering device as claimed in claim 57, said gate being mounted on said housing for linear shifting movement between said open and closed positions.

* * * * *